Nov. 18, 1947.  A. J. ROSENBERGER  2,431,200
LEVER MOUNTING ARRANGEMENT FOR PRESSURE RESPONSIVE MEASURING INSTRUMENTS
Filed Oct. 23, 1944
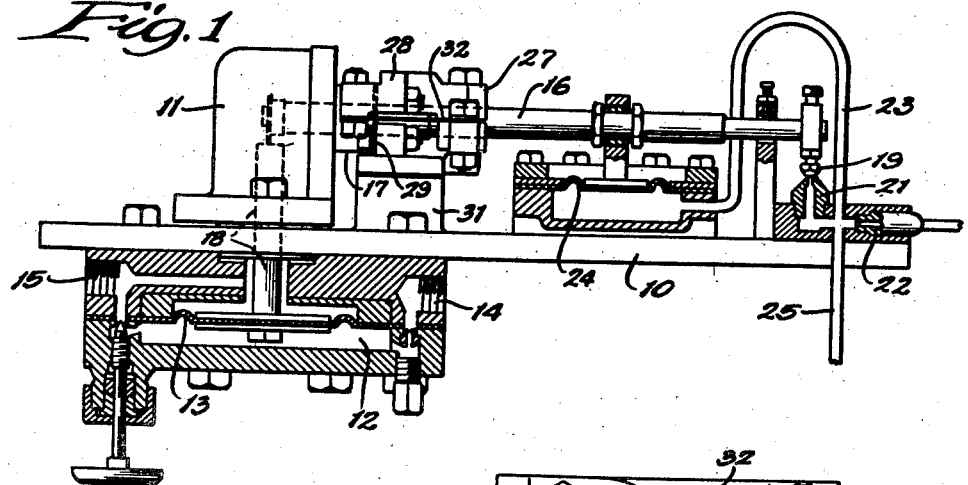
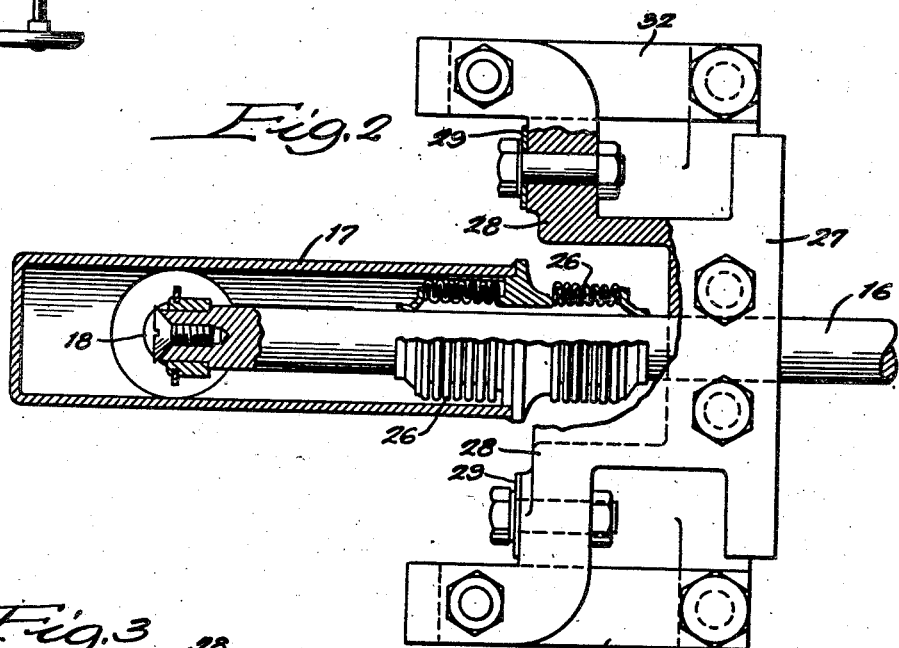
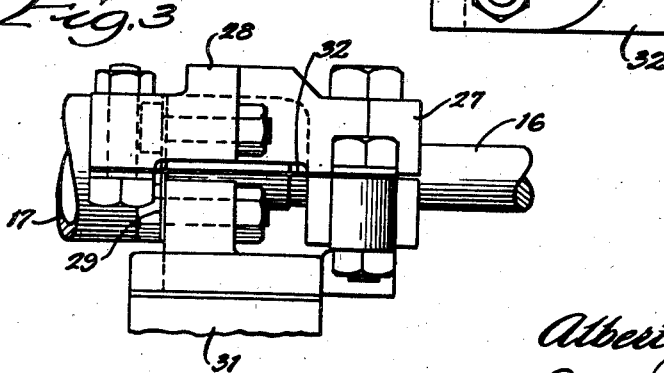
Inventor:
Albert J. Rosenberger,
By Dawson, Ooms & Booth,
Attorneys.

Patented Nov. 18, 1947

2,431,200

UNITED STATES PATENT OFFICE 2,431,200

LEVER MOUNTING ARRANGEMENT FOR PRESSURE RESPONSIVE MEASURING INSTRUMENTS

Albert J. Rosenberger, Chicago, Ill., assignor to Republic Flow Meters Company, Chicago, Ill., a corporation of Illinois Application October 23, 1944, Serial No. 559,978

2 Claims. (Cl. 74—519)

This invention relates to pressure responsive measuring instruments and more particularly to an improved mounting arrangement for the pivoted lever or weigh beam of such an instrument.

One of the objects of the invention is to provide an instrument which is extremely simple and inexpensive to construct and which is accurate and reliable in operation.

Another object is to provide an instrument employing a pivoted lever or beam which is pivotally supported on flexible crossing strips.

Still another object is to provide an instrument in which the pivoted lever is sealed to its housing by a flexible sealing member and which is pivotally supported on flexible crossing strips outside of the housing.

A still further object of the invention is to provide an instrument in which the flexible strips pivotally supporting the lever are held under tension by the forces acting on the lever.

The above and other objects and advantages of the invention will be more readily apparent from the following description when read in connection with the accompanying drawing, in which—

Figure 1 is a side elevation with parts in section of an instrument embodying the invention;

Figure 2 is an enlarged horizontal section with parts in elevation; and

Figure 3 is an enlarged partial elevation of the beam pivotal mounting.

The instrument as shown is of the same general type as that more particularly described and claimed in my Patent No. 2,354,423 and comprises a base 10 on which a hollow housing 11 is mounted. An extension of the housing below the base provides an enlarged diaphragm chamber 12 in which a flexible diaphragm 13 is mounted. Pressure is applied to the lower side of the diaphragm thru a tapped opening 14 and to the upper side of the diaphragm to a similar opening 15. It will be noted from Figure 1 that the space above the diaphragm is in open communication with the interior of the housing 11. The instrument as shown, may measure any desired condition but is particularly adapted for the measurement of fluid flow thru a conduit. For this purpose, the opening 14 may be connected to the upstream side of a restriction in the conduit and the opening 15 may be connected to the downstream side.

Above the base 10 a lever or weigh beam 16 is pivotally supported adjacent the housing with one end of the lever extending into a horizontal extension 17 on the housing as best seen in Figure 2. The inner end of the lever 16 is connected to the diaphragm 13 by a connecting rod or post 18 so that the force on the diaphragm will tend to tilt the lever clockwise about its pivot.

The lever carries at its outer end a valve member 19 which is moved by the lever toward and away from a restricted nozzle 21 which is supplied with fluid such as air thru a restriction 22. It will be understood that with this construction the pressure between the nozzle 21 and restriction 22 is controlled by the approach and recession of the valve member 19 relative to the nozzle. This regulated pressure is conducted thru a pipe 23 to the space below a flexible diaphragm 24 which is connected to the lever 16 to urge it in a counter-clockwise direction in response to the pressure. The pressure may also be conducted thru a pipe 25 to indicating, recording or control instrument, as desired.

The space between the lever 16 and the housing extension 17 is sealed by one or more flexible sealing members shown as bellows 26. As shown in Figure 2, two bellows are provided connected at one end to the beam 16 and at their opposite ends to the housing 17 to seal the space between the beam and housing against fluid flow while permitting the beam to tilt. It will be understood that one bellows could be omitted if desired or that other types of sealing members could be employed equally well.

In order to support the beam for pivotal movement a yoke member 27 is connected to the beam outside of the housing 17 and has its two arms 28 extending on opposite sides of the housing in alignment with the beam. The arms are pivotally supported by vertically extending flexible strips 29 which are secured at their upper ends to the arms and at their lower ends to a support 31 fixed on the base 10. A second pair of flexible strips 32 are secured at one end to the arms 28 and at their opposite ends to brackets on the support 31. It will be noted particularly from Figure 3 that the strips 29 and 32 cross at a point closely adjacent the arms 28 to define a pivotal axis about which the lever 16 may pivot.

According to one feature of the invention the strips 29 and 32 are preferably retained under tension at all times during operation. Since the force exerted on the lever by the diaphragms 13 and 24 is in an upward direction, the strips 29 are secured at their upper ends to the arms 28 and at their lower ends to the support 31. In this way the force exerted on the lever by the diaphragms maintains the strips 29 under tension. In the instrument illustrated, the pressure in the housing 11 is less than atmospheric so that the pressure differential on the sealing diaphragm 26 tends to urge the lever 16 to the left. The strips 32 are, therefore, connected at their left ends to the arms 28 and at their right ends to the support 31 so that the force on the sealing bellows will maintain them under tension. The strips 29 and 32 may be made of any desired material but are preferably thin flexible metal springs.

In operation of the apparatus the actual pivotal movement of the beam 16 is extremely small so that the strips 29 and 32 are not flexed to any substantial extent. This fact, together with the arrangement of the strips so that they cross closely adjacent the arms 28, results in a pivotal mounting which provides a substantially fixed axis. Due to the flexibility of the strips the lever 16 may be moved without friction and substantially without any interfering forces in the pivotal mounting which would interfere with proper operation of the instrument.

While one embodiment of the invention has been shown and described in detail herein, it will be understood that this is illustrative only and is not intended as definition of the scope of the invention, reference being had for this purpose to the appended claims.

What is claimed is:

1. In a measuring instrument, a hollow housing adapted to be exposed to a different pressure on its interior than on its exterior, a lever pivoted adjacent the housing with one end extending into the housing, a flexible sealing member connecting the lever and the housing to prevent flow of fluid around the lever, means in the housing applying a force to the lever at substantially a right angle thereto and urging the lever to tilt in one direction, means outside of the housing applying a force to the lever at substantially a right angle thereto and urging the lever to tilt in the other direction, and pivotal mounting means for the lever lying between the tilting means and comprising a flexible tension member connected to the lever at substantially a right angle thereto and tensioned by the tilting means and a second flexible tension member connected to the lever substantially parallel thereto and tensioned by the pressure differential on the flexible sealing member.

2. In a measuring instrument, a hollow housing adapted to be exposed to a different pressure on its interior than on its exterior, a lever pivoted adjacent the housing with one end extending into the housing, a flexible sealing member connecting the lever and the housing to prevent flow of fluid around the lever, means in the housing applying a force to the lever at substantially a right angle thereto and urging the lever to tilt in one direction, means outside of the housing applying a force to the lever at substantially a right angle thereto and urging the lever to tilt in the other direction, a yoke connected to the lever between the tilting means with its arms extending on opposite sides thereof, a pair of flexible tension members lying in a plane at substantially right angles to the lever and connected respectively to the arms of the yoke to be tensioned by the tilting means, and a pair of flexible tension members lying in a plane parallel to the lever and connected respectively to the arms of the yoke to be tensioned by the pressure differential on the sealing member.

ALBERT J. ROSENBERGER.

REFERENCES CITED

The following references are of record in the file of this patent:

UNITED STATES PATENTS

| Number | Name | Date |
| --- | --- | --- |
| 392,617 | Lieb et al. | Nov. 13, 1888 |
| 2,024,571 | Gent | Dec. 17, 1935 |
| 2,177,398 | Aller | Oct. 24, 1939 |
| 2,299,179 | Rosenberger | Oct. 20, 1942 |
| 2,354,423 | Rosenberger | July 25, 1944 |
| 1,992,048 | Temple | Feb. 19, 1935 |